No. 872,709. PATENTED DEC. 3, 1907.
T. A. BLAKELY.
ANTIFRICTION BEARING.
APPLICATION FILED FEB. 23, 1907.

2 SHEETS—SHEET 1.

Witnesses.
H. C. Trimble.
Charles L. Cope

Inventor.
Thomas A. Blakely
by Chas. H. Riches
his attorney

No. 872,709. PATENTED DEC. 3, 1907.
T. A. BLAKELY.
ANTIFRICTION BEARING.
APPLICATION FILED FEB. 23, 1907.
2 SHEETS—SHEET 2.
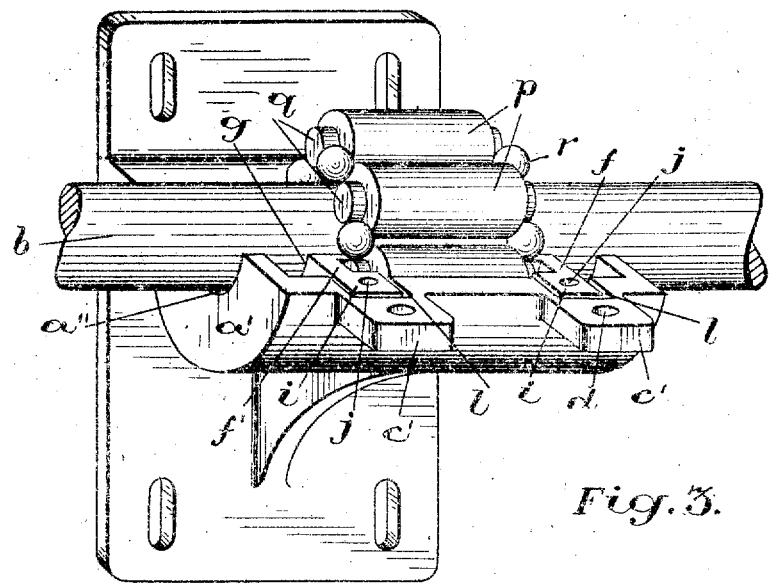
Fig. 3.
Fig. 5.
Fig. 6.
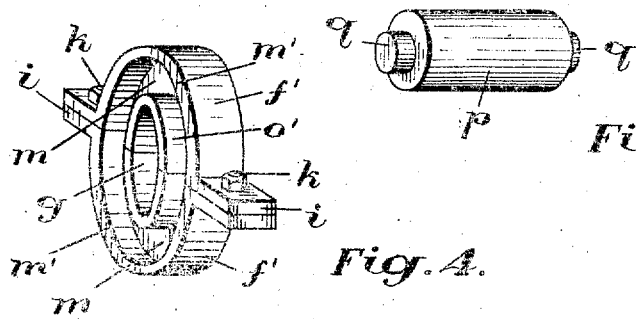
Fig. 7.
Fig. 4.
Witnesses. Inventor.

UNITED STATES PATENT OFFICE.

THOMAS A. BLAKELY, OF FLESHERTON, ONTARIO, CANADA, ASSIGNOR OF ONE-HALF TO FREDERICK W. HARRISON, OF OWEN SOUND, CANADA.

ANTIFRICTION-BEARING.

No. 872,709.  Specification of Letters Patent.  Patented Dec. 3, 1907.

Application filed February 23, 1907. Serial No. 358,919.

*To all whom it may concern:*

Be it known that I, THOMAS ALBERT BLAKELY, of the village of Flesherton, in the county of Grey and Province of Ontario, Canada, have invented certain new and useful Improvements in Antifriction-Bearings; and I hereby declare that the following is a full, clear, and exact description of the same.

This invention relates to an anti friction bearing in which the bearing rollers are contained laterally between two separated retaining rings, and held in a properly spaced condition by anti friction spacers which are so arranged as to prevent the bearing rollers contacting one another or the retaining rings, as hereinafter set forth and particularly pointed out in the claims.

For a full understanding of the invention, reference is to be had to the following description, and to the accompanying drawings, in which,—

Figure 1:
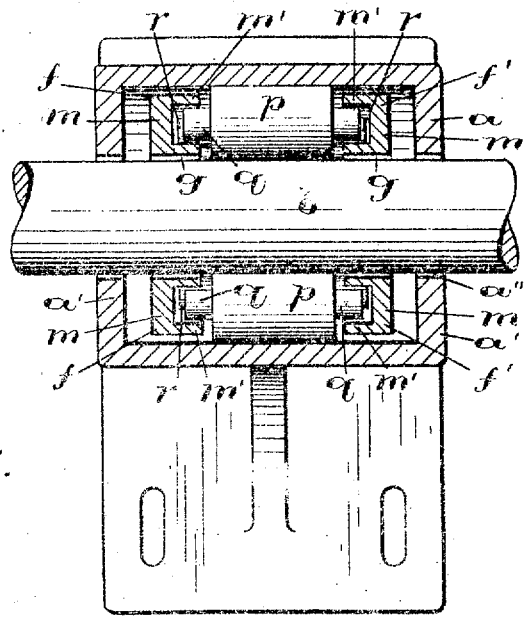
Figure 2:
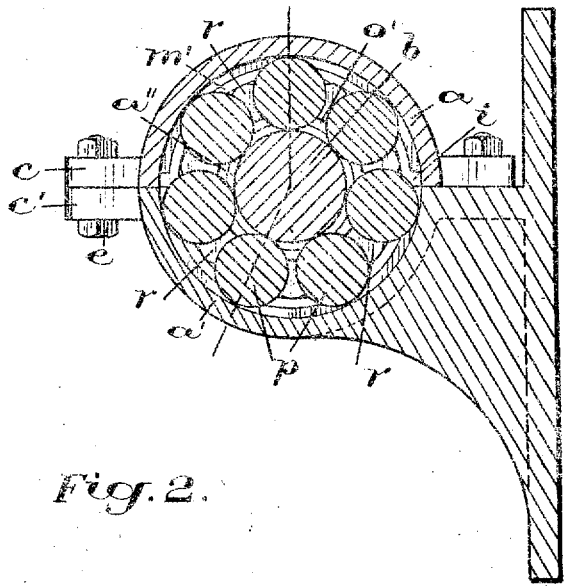

Figure 1, is a section of an antifriction bearing and part of the line shaft. Fig. 2, is a section of the same construction, taken at right angles to Fig. 1. Fig. 3, is a perspective view of a modification of the construction shown in Figs. 1, and 2 with the upper journal box section and retaining ring parts removed. Fig. 4, is a perspective view of one of the retaining rings shown in the preceding views. Fig. 5, is a perspective view of one of the anti friction spacers shown in Figs. 1, and 2. Fig. 6, is a detail view of one of the anti friction spacers shown in Fig. 3. Fig. 7, is a view of one of the load bearing rollers.

Like characters of reference refer to like parts throughout the specification and drawings.

The journal box containing the anti friction bearing is preferably made of two separable journal box sections $a$ and $a'$ with the usual longitudinal bore $a''$ for the shaft $b$. Each of the journal box sections $a$ and $a'$ is formed with flanges $c$ and $c'$ having bolt holes $d$ for the clamping bolts $e$ by which the journal box sections $a$ and $a'$ are securely fastened together to form the journal box. Contained within the journal box are two retaining rings $f$ and $f'$ having longitudinal bores $g$ alined with the journal box bore $a''$.

Each of the bearing rings $f$ and $f'$ consist of two separable bearing ring sections formed with flanges $i$ having bolt holes $j$ for the fastening bolts $k$ by which the retaining ring sections are clamped together. In the journal box sections $a'$ are flange seats $l$ to receive the flanges $i$ of the retaining ring sections, when the parts are assembled, and securely hold the retaining rings immovable in their fixed positions in the journal boxes. Each of the retaining rings consists of a side plate $m$ having an annular hub $o'$ with a bore $g$ and an annular rim $m'$ concentric with the hub and projecting laterally from the side plate.

Encircling the shaft $b$ are antifriction bearing rollers $p$ of less length than the distance between the inner faces of the rims $m'$ so that they will not engage therewith, and projecting longitudinally from the centers of the ends of the anti friction bearing rollers $p$ are trunnions $q$ which enter within the recesses formed by the rims $m'$ and $o'$, and are of less length than the depth thereof. The diameter of these anti friction bearing rollers is slightly less than the width of said recesses. The anti friction bearing rollers $p$ contact the shaft $b$ and the journal box $a$, $a'$ to provide an approximately frictionless bearing surface for the shaft under all conditions of load and action, and the radial displacement of the anti friction rollers, is prevented by their contact with the shaft and bearing box. To maintain the correct alinement, and spacing of the anti friction bearing rollers, anti friction spacers $r$ are interposed between the trunnions $q$.

As shown in Figs. 1, 2, and 5, the anti friction spacers consist of spacing rollers of a diameter which will enable them to contact the trunnions and hold them evenly spaced around the line shaft, and of a length which will prevent the ends of the anti friction bearing rollers coming into contact with and binding against the side edges of the rims $m'$ during their individual or collective revolutions.

In Figs. 3, and 6, the anti friction spacers are shown to consist of spacing balls, of greater diameter than the length of the trunnions and depth of the recesses and are employed in the same way and for the same purpose as the anti friction spacers shown in Figs. 1, 2, and 5. The rims of the retaining rings prevent the outward radial displacement of the antifriction spacers, and the inward radial displacement of the anti friction spacers is prevented by hubs $o'$ of the retaining rings. The longitudinal movement of the anti friction rollers is limited by the anti friction spacers, which engage the ends of the antifriction bearing rollers, and the inner faces of the recesses of the retaining rings. The length of the antifriction spacers is slightly greater than the width of the inner faces of the rims $m'$ so that they will hold the ends of the anti friction rollers entirely clear of contact with the side edges of the rims $m'$.

The revolution of the shaft causes the independent revolution of each antifriction bearing roller around its own axis, and the collective revolution of the anti friction bearing rollers around the axis of the shaft so that the wear will be as nearly as possible, evenly distributed to each anti friction bearing roller, and to each part thereof.

By making the anti friction spacers of a greater length than the trunnions of the antifriction bearing rollers, it is possible for the antifriction bearing rollers to move for a limited distance endwise in each direction to clear themselves of the jam caused by the end thrust movement of the line shaft, and by making the antifriction spacers of a greater length than the distance between the inner faces $m$ and $m'$ of the rim, it is possible to prevent the antifriction bearing rollers coming into contact with the side edges of the bearing rings.

Having thus fully described my invention, what I claim as new and desire to secure by Letters Patent is:

An anti friction bearing comprising a journal box, having a longitudinal bore therethrough, and composed of two separable sections with means for fastening them together, there being flange seats within the journal box sections, retaining rings consisting of separable sections contained within the journal boxes and having flanges with means for fastening them together, said retaining rings comprising annular rims, and side plates with longitudinal bores alined with the longitudinal bore of the journal box, antifriction bearing rollers arranged in an annular set between the retaining rings and of less length than the distance between the inner faces of said annular rims, there being trunnions for the anti friction bearing rollers projecting within the plane of said rims but not extending to the side faces of the retaining rings, anti friction spacers contained within the retaining ring rims and interposed between the trunnions of the anti friction bearing rollers, and of greater dimension than the width of the inner faces of the retaining ring rims to contact with the side faces of the retaining rings and the ends of the anti friction bearing rollers, to prevent the ends of the anti friction bearing rollers coming into contact with the retaining ring rims.

Toronto, February 2nd 1907.

THOS. A. BLAKELY.

Signed in the presence of—
W. L. WRIGHT,
WM. H. BUNT.